United States Patent [19]
Thomas et al.

[11] Patent Number: 5,907,228
[45] Date of Patent: May 25, 1999

[54] ROTATING MACHINE CONTROL COMMAND METHOD, SERVOCONTROL SYSTEM FOR IMPLEMENTING SAID METHOD, ROTATING MACHINE PROVIDED WITH A SYSTEM OF THIS KIND

[75] Inventors: Jean-Luc Thomas, Thomery; Serge Poullain, Ste Genevieve Des Bois; Olivier Bethoux, Paris; Guy Bornard, St Marin D'Heres, all of France

[73] Assignee: Alcatel Alsthom Compagnie Generale D'Electricite, Paris, France

[21] Appl. No.: 08/870,413

[22] Filed: Jun. 5, 1997

[30] Foreign Application Priority Data

Jun. 6, 1996 [FR] France .................................. 96 07 015

[51] Int. Cl.$^6$ ...................................................... H02P 5/40
[52] U.S. Cl. ................................. 318/568.1; 318/568.12; 318/801; 364/474.3
[58] Field of Search ..................... 318/701–823; 364/474.1–474.38

[56] References Cited

U.S. PATENT DOCUMENTS

| | | | |
|---|---|---|---|
| 4,707,651 | 11/1987 | Schauder | 318/800 |
| 5,502,360 | 3/1996 | Kerkman et al. | 318/805 |
| 5,565,752 | 10/1996 | Jansen et al. | 318/807 |
| 5,585,709 | 12/1996 | Jansen et al. | 318/807 |
| 5,708,346 | 1/1998 | Schob | 318/803 |

OTHER PUBLICATIONS

Y. A. Chapuis et al., Commande Directe Due Couple D'une Machine Asynchrone Par Le Controle Direct De Son Flux Statoroque Direct Torque Control, *Journal De Physique III*, vol. 5, No. 6, Jun. 1, 1995, pp. 863–880.

P. Brandsetter et al, "Control Methods for Permanent Magnet Synchronous Motor Drives with High Dynamic Performance", EPE '95: 6th European Conference on Power Electronics and Applications, Sevilla, Sep. 19–21, 1995, vol. 3, Sep. 19, 1995, European Power Electronics and Drives Association, pp. 3.805–3.810.

M. P. Mazmierkowski et al, "Improved Direct Torque and Flux Vector Control of PWM Inverter–Fed Induction Motor Drives", IEEE Transactions on Industrial Electronics, vol. 42, No. 4, Aug. 1, 1995, pp. 344–350.

T. G. Habetler et al, "Control Strategies for Direct Torque Control Using Discrete Pulse Modulation", IEEE Transactions on Industry Applications, vol. 27, No. 5, Sep. 1, 1991, pp. 893–901.

*Primary Examiner*—Paul Ip
*Attorney, Agent, or Firm*—Sughrue, Mion, Zinn, Macpeak & Seas, PLLC

[57] ABSTRACT

In a method of regulating a rotating machine with n phases fed with alternating current by a voltage inverter including n SPmLL defining $m^n$ states $V_i$ ($i \in \{1, \ldots, m^n\}$) of the stator phase voltage vector $V_s$, the machine having an electromagnetic torque $T_{em}$ and a stator flux $\phi_S$ slaved to a commanded electromagnetic torque $T_{emref}$ and stator flux $\phi_{Sref}$ for transient conditions in which the electromagnetic torque $T_{em}$ and/or the stator flux $\phi_S$ are respectively far away from the commanded electromagnetic torque $T_{emref}$ and/or stator flux $\phi_{Sref}$ from all possible states $V_i$ of the stator phase voltage vector $V_s$, the one is chosen which is optimal for causing the torque $T_{em}$ and the stator flux $\phi_S$ to converge towards the commanded torque $T_{emref}$ and stator flux $\phi_{Sref}$; and switching of the SPmLL corresponding to the chosen state of the phase voltage vector $V_s$ is commanded.

11 Claims, 8 Drawing Sheets

ROTATING MACHINE CONTROL COMMAND METHOD, SERVOCONTROL SYSTEM FOR IMPLEMENTING SAID METHOD, ROTATING MACHINE PROVIDED WITH A SYSTEM OF THIS KIND

BACKGROUND OF THE INVENTION

1. Field of the Invention

The invention concerns a rotating machine control command method, a servocontrol system for implementing said method, and a rotating machine provided with a system of this kind. To be more precise the present invention concerns a method of controlling the torque and the stator flux of a rotating machine.

2. Description of the Prior Art

Vectorial rotor flux control devices are known in themselves. Their control function is based on actual control of the magnetic state of the rotor and the torque of the machine. However, this type of device necessitates the provision of sensors on the rotating parts of the machine in order to sense a mechanical quantity needed for the calculation. Also, these devices are highly sensitive to variation in the parameters of the machine. Finally, these devices necessitate the use of pulse width modulation (PWM) which introduces a timedelay into the response time of the machine on the occasion of a torque or speed step.

In an alternative method known in itself the control quantities are the electromagnetic torque and the stator flux. This method does not necessitate the use of PWM.

This method relies on vectorial modelling of the machine and the voltage inverter.

For the machine, it is known that the electromagnetic torque is a function of the angle between the rotor flux rotating vector and the stator flux rotating vector and the moduli of these flux vectors. In other words, the electromagnetic torque is a function of the vector product of the rotating flux vectors:

$$T_{em} = K(\phi_R \times \phi_S)$$

The stator voltage vector $V_s$ is delivered by a three-phase voltage inverter, each phase including a single-pole two logic levels (SP2LL) switch. Accordingly, the stator voltage vector $V_s$ can assume eight ($2^3$) states $V_1 \ldots V_8$, two of which $V_1$, $V_8$ are of zero amplitude (zero states) in the stator fixed coordinate system $(\alpha, \beta)$, according to the combination of the states of the three SP2LL of the inverter.

A direct torque control (DTC) system known in itself (FIG. 1) relies, in the stator coordinate system $(\alpha, \beta)$, on maintaining the modulus $|\phi_S|$ of the rotating stator flux vector $\phi_S$ in a hysteresis band H and on controlling the torque $T_{em}$ by accelerating the rotating stator flux vector $\phi_S$ relative to the rotor flux vector $\phi_R$ for an increase in the torque $T_{em}$ (increase in the angle between the two flux vectors) and by stopping the stator flux vector $\phi_S$ so that the rotor flux vector $\phi_R$ catches up to reduce the torque (reduction in the angle between the two flux vectors).

The stator flux vector $\phi_S$ is controlled by means of a finite table. For a given location $N_i$ ($i=1 \ldots 6$) of the rotating stator flux vector $\phi_S$ in the plane of the stator $(\alpha, \beta)$, this table contains the states $V_1 \ldots V_8$ of the stator phase voltage vector $V_s$ which enable stopping of the stator flux vector (zero states $V_1$, $V_8$) and those which are used to open out the angle between the flux vectors $\phi_S$, $\phi_R$, whilst maintaining the stator flux vector $\phi_S$ in the hysteresis band H. The finite table below and FIG. 1 illustrate this method.

| | Finite table | | |
|---|---|---|---|
| | $T_{em}$ increasing | | $T_{em}$ decreasing |
| ZONE $N_i$ | $|\phi_s|$ increasing | $|\phi_s|$ decreasing | $\phi_s$ stopped |
| $N_1$ | $V_3$ | $V_4$ | $V_1, V_8$ |
| $N_2$ | $V_4$ | $V_5$ | $V_1, V_8$ |
| $N_3$ | $V_5$ | $V_6$ | $V_1, V_8$ |
| $N_4$ | $V_6$ | $V_7$ | $V_1, V_8$ |
| $N_5$ | $V_7$ | $V_2$ | $V_1, V_8$ |
| $N_6$ | $V_2$ | $V_3$ | $V_1, V_8$ |

Figure 1:
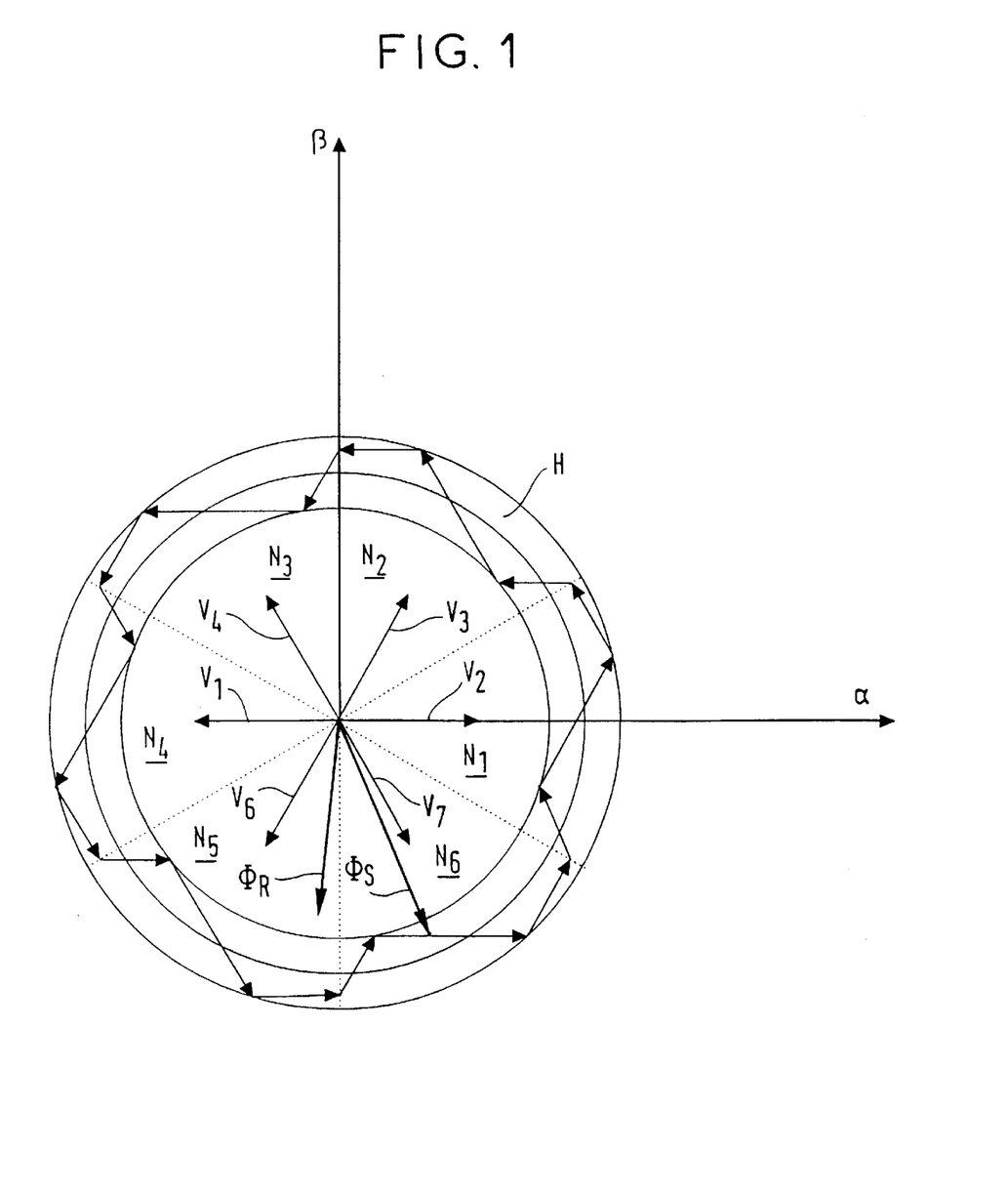
FIG. 1 is a schematic representation of the prior art method in the fixed stator plane.

In FIG. 1, for example, $\phi_S$ is in the zone $N_6$ and its end tracks the state $V_2$ of the stator phase voltage vector $V_s$. The state $V_2$ is a state which causes $|\phi_S|$ to increase. The system will switch to $V_3$ as soon as $|\phi_S|$ reaches the upper limit of the hysteresis band H.

This technique has a number of drawbacks, including:

The finite table is not exhaustive in terms of the possible dynamic situations of the rotating machine.

Conceiving a table to take exhaustive account of the situations of the machine is inconceivable (in the simple case of an inverter with three SP2LL there are already six domains in each of which four states may be used). What is more, a malfunction of one of the SP2LL eliminates three possible states of the stator phase vector $V_s$ which significantly reduces the size of the command finite table and can end up with the rotating machine in an out of control situation (torque peak).

The proposed technique dedicates stator flux $\phi_S$ control (maintaining the stator flux modulus within the hysteresis band H) to torque $T_{em}$ control. Configurations in which stator flux $\phi_S$ control is required concomitantly with torque $T_{em}$ control are not provided for.

In the case of a negative torque step (stepwise torque reduction) at low rotor rotation speed, the response dynamics of the above solution are very poor. In particular, the response time to the negative step is in the order of four times the response time to a positive step of the same amplitude.

In a torque reduction configuration, the device stops the rotation of the stator flux (zero state) and the rotor flux catches up the stator flux, so reducing the angle and therefore the torque. At low motor rotation speeds, the rotor flux also rotates at low speed, which significantly affects the torque response dynamics.

This configuration at low rotation speeds can be illustrated by the starting up of a traction unit, the poor dynamics by slippage of the traction unit wheels (torque reduction too slow).

The switching strategy for the voltage inverter is the same under transient conditions (the instantaneous values of the flux and of the torque are far away from the commanded values) or under steady state conditions (the instantaneous values of the flux and of the torque oscillate about the commanded values). Accordingly, under steady state conditions, the average switching frequency of the voltage inverter is no longer controllable and is chaotic. For high maximal voltages and currents this can quickly lead to irreversible damage to some SP2LL and therefore end up with the rotating machine in an uncontrollable state, for the reasons previously cited.

One aim of the present invention is to propose a method in which, the control quantities being also the electromagnetic torque and the stator flux, regardless of the situation of the rotating machine at a given time, the optimal stator phase voltage vector $V_s$ state is chosen, from all the possible states, for the best possible response to the required control strategy.

SUMMARY OF THE INVENTION

To this end, the invention consists in a method of regulating a rotating machine with n phases fed with alternating current by a voltage inverter, including n SPmLL defining $m^n$ states $V_i$ (i∈{1, ..., $m^n$}) of the stator phase voltage vector $V_s$, the electromagnetic torque $T_{em}$ and stator flux $\phi_S$ of said machine being slaved to an electromagnetic torque $T_{emref}$ and a stator flux $\phi_{Sref}$ by a servocontrol system including a set of sensors the values sensed by which are transmitted to an observer, the outputs of the observer being fed into a computer, said computer providing at its output command signals to command the SPmLL of the voltage inverter;

wherein, in accordance with a control strategy for transient conditions in which the electromagnetic torque $T_{em}$ and/or the stator flux $\phi_S$ are respectively far from the commanded electromagnetic torque $T_{emref}$ and/or stator flux $\phi_{Sref}$, the computer:

chooses from all possible states $V_i$ of the stator phase voltage vector $V_s$ that which is optimal for causing the torque $T_{em}$ and the stator flux $\phi_S$ to converge towards the commanded torque $T_{emrf}$ and stator flux $\phi_{Sref}$; and produces command signals for commanding the SPmLL in accordance with the chosen state of the phase voltage vector $V_s$.

Accordingly, the response dynamics to a negative torque differential are better than in the prior art.

If n and/or m have high values, this generates many possible states. The invention has the further advantage that if one of the SPmLL is accidentally stuck in a position that is not optimal for a given configuration, the method will continue to choose from the remaining states the best possible state to converge towards the commanded values. The dynamic performance of the control function is affected, but the risks of divergence or of torque peaks are minimized.

In accordance with a control strategy for steady state conditions in which the torque $T_{em}$ and the stator flux $\phi_S$ are respectively in a range $\pm\Delta T_{em}$ about $T_{emref}$ and in a range $\pm\Delta\phi_S$ about $\phi_{Sref}$ the computer:

chooses from all possible states $V_i$ of the stator phase voltage vector $V_s$ the one which is optimal for a predefined average inverter switching frequency, and to minimize the amplitudes of the oscillations of the torque $T_{em}$ and the stator flux $\phi_S$ about the commanded torque $T_{emref}$ and stator flux $\phi_{Sref}$, respectively, and/or to conform to a frequency template for the torque $T_{em}$ produces command signals for commanding the SPmLL according to the chosen state of the phase voltage vector $V_s$.

In one embodiment of the method, to determine the optimal state, in an initialization step of the method:

a virtual output plane P is constructed in the computer of which one axis y is representative of the electromagnetic torque and the other axis x is representative of the stator flux, the commanded torque and stator flux being represented by a point $A_{ref}$ and the instantaneous torque and stator flux by a point A, a plane element ($\pm\Delta x$, $\pm\Delta y$) being defined around the point $A_{ref}$, the computer using the steady state conditions control strategy if the point A is inside the plane element and the transient conditions control strategy if the point A is outside the plane element, a state model of the rotating machine is fed into the computer in which the output vector S is a vector of the output plane P and the command vector C is the phase voltage vector $V_s$; and under transient conditions, on each sampling, the computer:

calculates the vector (A-$A_{ref}$)

calculates the directional derivative $\dot{S}$ of the output vector S for each of the possible states $V_i$ of the phase voltage vector $V_s$, calculates the scalar product of each of the directional derivatives $\dot{S}(V_i)$ of the output vector S by the vector (A-$A_{ref}$), chooses as the command vector C the state $V_i$ of the phase voltage vector $V_s$ associated with the largest of the calculated scalar products, Additionally, in the initialization step of the method:

a cyclic path is constructed in the computer along which the point A circulates about the point $A_{ref}$ in the plane element, the computer divides the plane element into commutation zones $Z_i$ matched to the cyclic path, an average switching frequency for the inverter is fed into the computer, the computer constructs a commutation table in which for each zone $Z_i$ it establishes the correspondence between the future optimal state $V_f$ of the stator phase voltage vector $V_s$ as a function of the current state $V_a$ and the past state $V_p$ of the stator phase voltage vector $V_s$ to track the cyclic circulation path in said zone $Z_i$; and in that, under steady state conditions, and on each sampling, the computer:

calculates the sizes of the commutation zones $Z_i$ as a function of the instantaneous configuration of the machine, in such a manner as to conform to the average switching frequency chosen chooses as the command vector C the future optimal state $V_f$ of the stator phase voltage vector $V_s$, on the basis of the commutation table, according to the zone $Z_i$ in which the point A is located and the current state $V_a$ and the past state $V_p$ of the stator phase voltage vector $V_s$.

In one embodiment the model of the rotating machine is a non-linear affine control model of the type:

$$\dot{E}=f(E)+g(E)Vs$$

$$S=h(E)$$

where E is the state vector, and f, g, h are analytic functions of the state vector E;

the directional derivative $\dot{S}$ of the output vector S is dependent on the state model:

$$\dot{S}(Vs) = \frac{\partial h(E)}{\partial E}\dot{E} = \frac{\partial h(E)}{\partial E}f(E) + \frac{\partial h(E)}{\partial E}g(E)Vs$$

Although based on a commutation table system the method is relatively reliable under steady state conditions. Point A can be caused to diverge and to leave the plane element. The system then swings over to the transient conditions in which the optimal available state $V_i$ is chosen in accordance with the transient conditions control strategy.

The plane element advantageously includes a hysteresis band having an inner limit and an outer limit such that:

the changeover from the transient conditions control strategy to the steady state conditions control strategy occurs if the point A has crossed the inner limit of the hysteresis band; and the changeover from the steady state conditions control strategy to the transient conditions control strategy occurs if the point A has crossed the outer limit of the hysteresis band.

Inverter average switching frequency control is an advantage in that it significantly limits switching losses in the SPmLL and therefore extends their service life.

The invention also consists in a servocontrol system implementing the method as described hereinabove.

The invention finally consists in a rotating machine including a servocontrol system of the above kind.

Other advantages and features of the present invention will emerge from the following description given with reference to the accompanying drawings.

DETAILED DESCRIPTION OF THE PREFERRED EMBODIMENT

The invention concerns a method of regulating a rotating machine 1 with n phases fed with alternating current by a voltage inverter 3 including n switches 4 each having m positions (hereinafter referred to as SPmLL: Single Pole m Logic Levels) defining $m^n$ states $V_i$ ($i \in \{1, \ldots, m^n\}$) of the stator phase voltage vector $V_s$, said machine 1 being slaved to a commanded electromagnetic torque $T_{emref}$ and stator flux $\phi_{Sref}$.

The servocontrol system of the machine includes a set of sensors the sensed values 7, 8, 9 from which are transmitted to an observer 10. The outputs of the observer 10 are representative values of the instantaneous electromagnetic torque $T_{em}$ and stator flux $\phi_S$ of the rotating machine. There are many sensors and observers 10 of greater or lesser sophistication.

The representative values of the electromagnetic torque $T_{em}$ and stator flux $\phi_S$ are fed into a computer 13 implementing the method of the invention. This computer 13 also receives as input the representative values of the commanded electromechanical torque and stator flux $T_{emref}$, $\phi_{Sref}$. The computer 13 outputs command signals 6 for commanding the SPmLL 4 of the voltage inverter 3.

The invention is more particularly concerned with the steps of the method that are executed in the computer 13.

The method of the invention proposes two control strategies according to the current configuration of the machine. These are:

under transient conditions, in which case the electromagnetic torque $T_{em}$ and/or the stator flux $\phi_S$ are respectively far away from the commanded electromagnetic torque $T_{emref}$ and/or stator flux $\phi_{Sref}$, and under steady state conditions, in which case the torque $T_{em}$ and the stator flux $\phi_S$ are respectively in a range $\pm \Delta T_{em}$ about $T_{emref}$ and in a range $\pm \Delta \phi_S$ about $\phi_{sref}$.

Under transient conditions, the method of the invention includes steps in which:

from all possible states $V_i$ ($i \in \{1, \ldots, m^n\}$) of the stator phase voltage vector $V_s$, the optimal one for the torque $T_{em}$ and the stator flux $\phi_S$ to converge towards the commanded torque $T_{emref}$ and stator flux $\phi_{Sref}$ is chosen; and switching of the SPmLL corresponding to the chosen state $V_i$ of the phase voltage vector $V_s$ is commanded.

Under steady state conditions, for a predetermined average inverter switching frequency, from all possible states $V_i$ ($i \in \{1, \ldots, m^n\}$) of the stator phase voltage vector $V_s$, the optimal one is chosen to minimize the amplitudes of the oscillations of the torque $T_{em}$ and the stator flux $\phi_S$ about the commanded torque $T_{emref}$ and stator flux $\phi_{Sref}$, respectively, and/or to conform to a frequency template for the torque $T_{em}$ switching of the SPmLL corresponding to the chosen state $V_i$ of the phase voltage vector $V_s$ is commanded.

The expression "conforming to a frequency template" means prohibiting certain frequencies or certain frequency ranges for the electromagnetic torque $T_{em}$.

Figure 2:
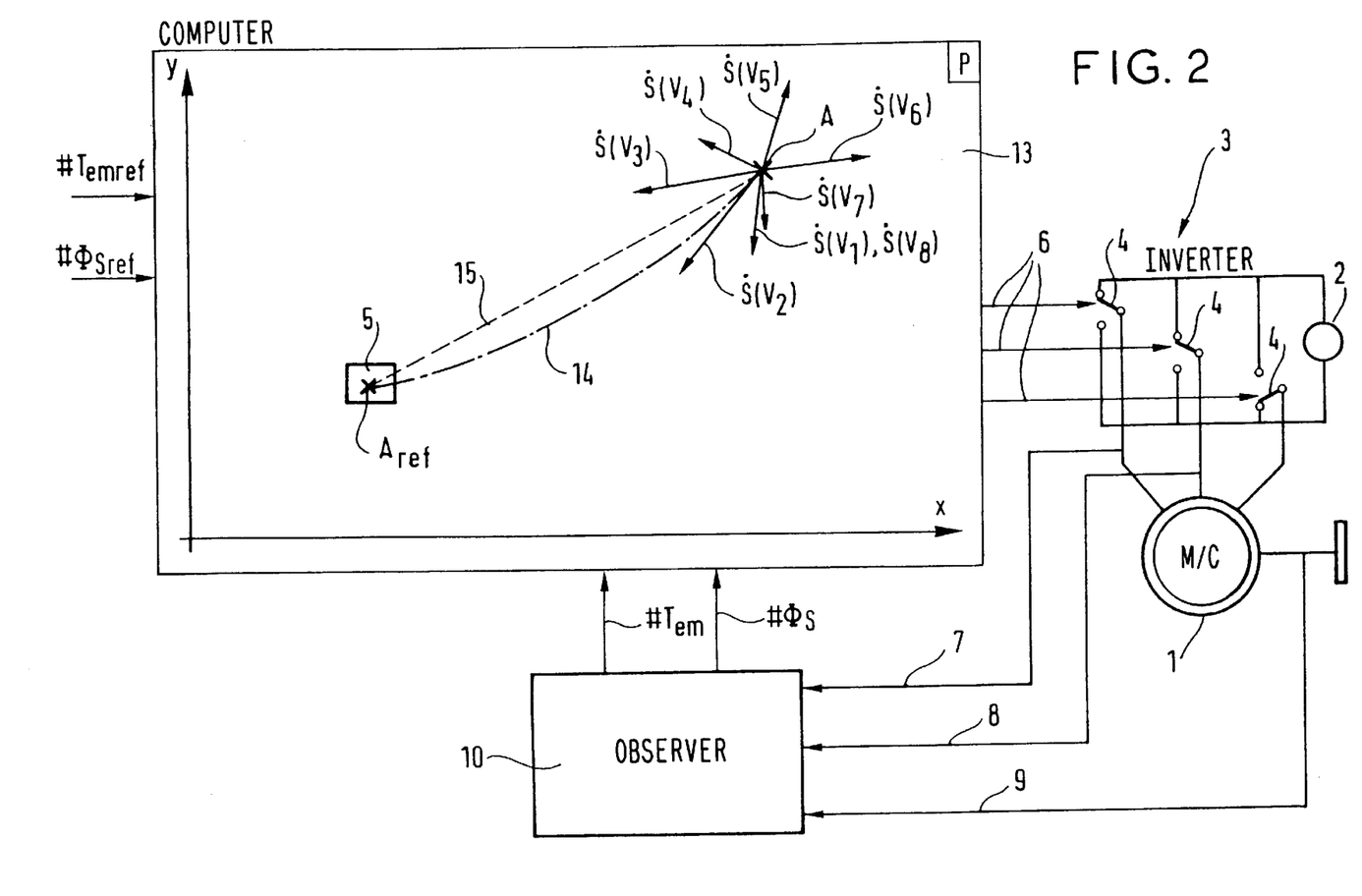
FIG. 2 is a schematic representation of the method of the invention for transient conditions.
Figure 3:
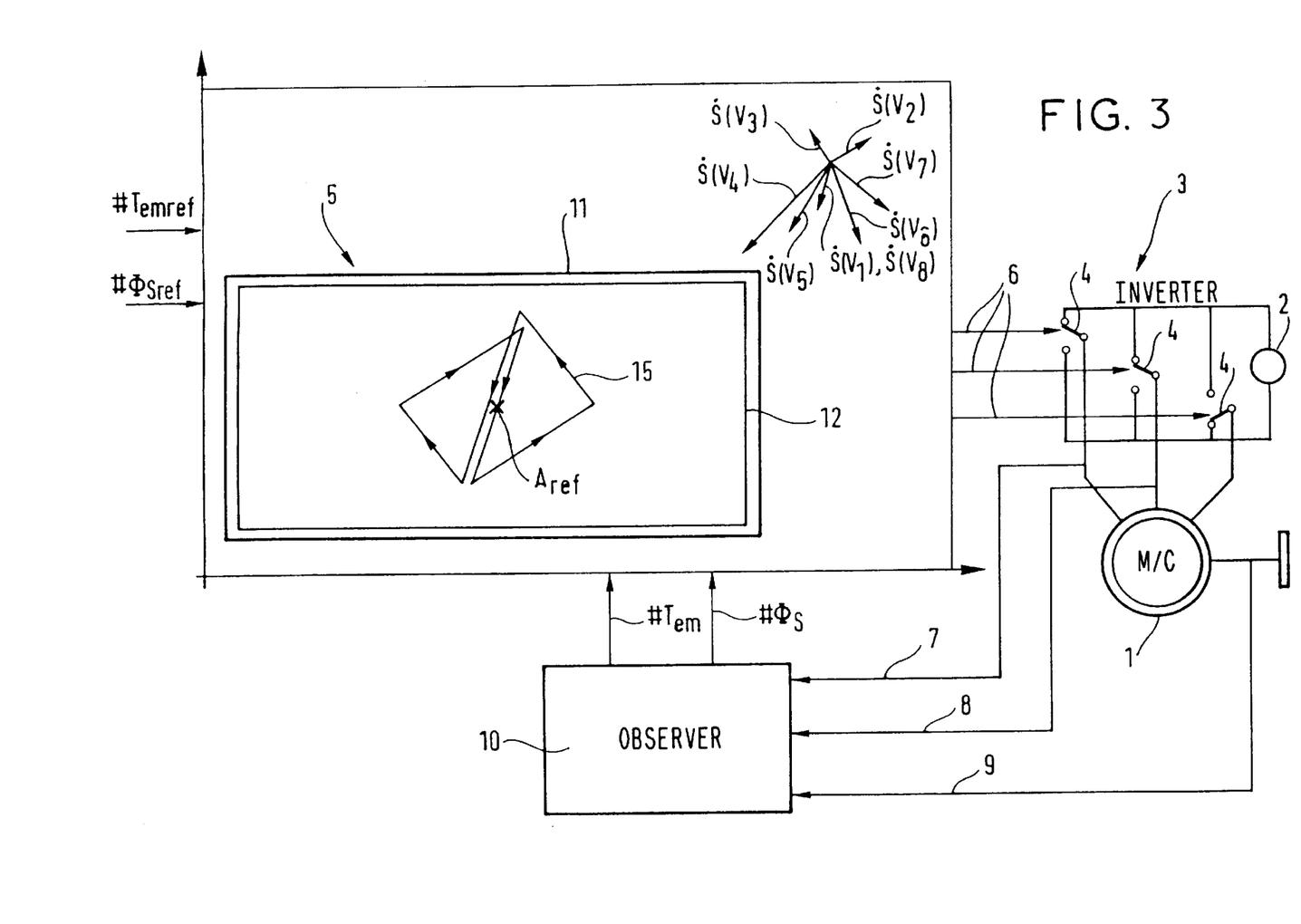
FIGS. 3 through 3E are schematic representations of the method of the invention for steady state conditions, on the basis of a particular cycle example.
Figure 3A:
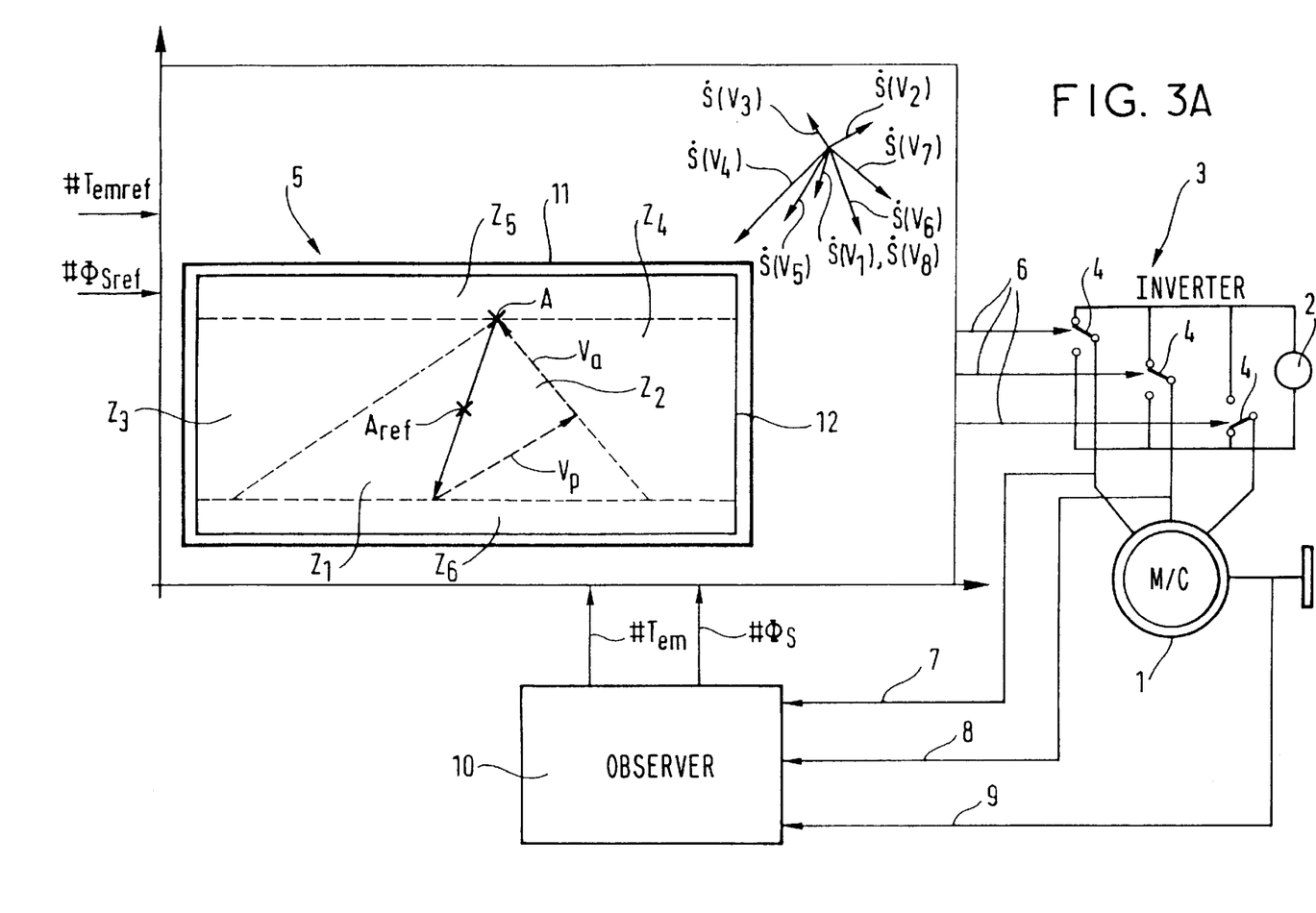
Figure 3B:
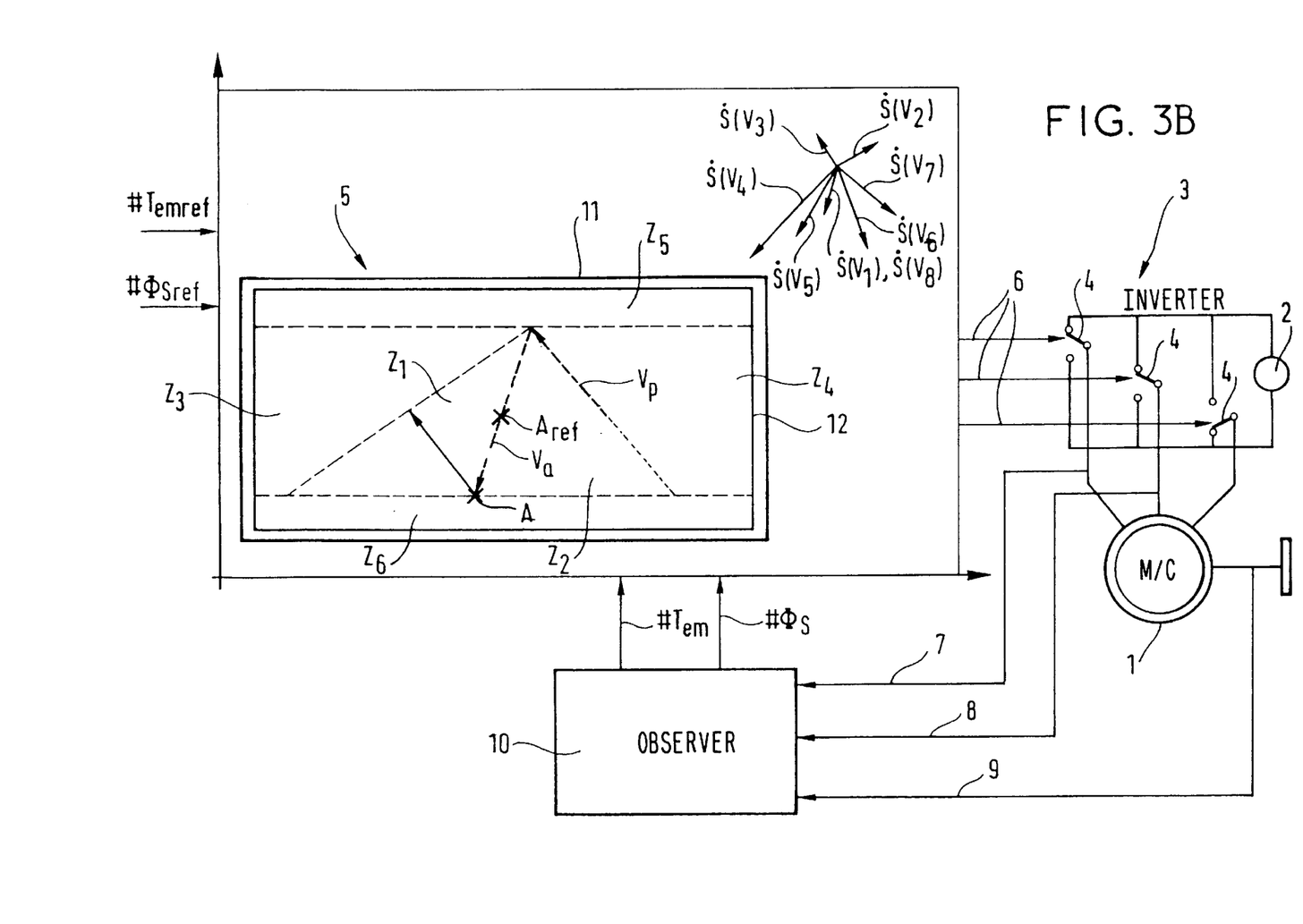
Figure 3C:
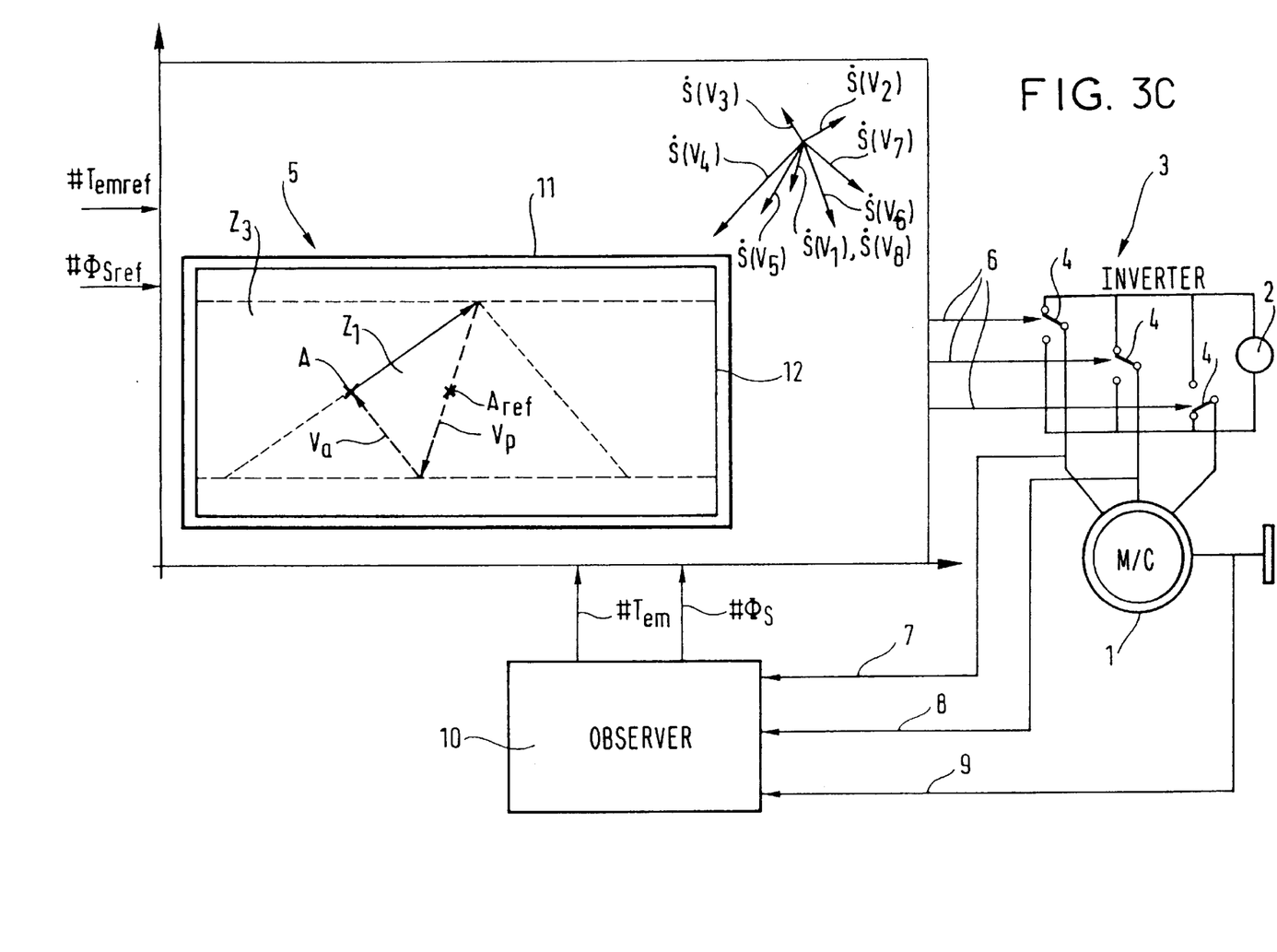
Figure 3D:
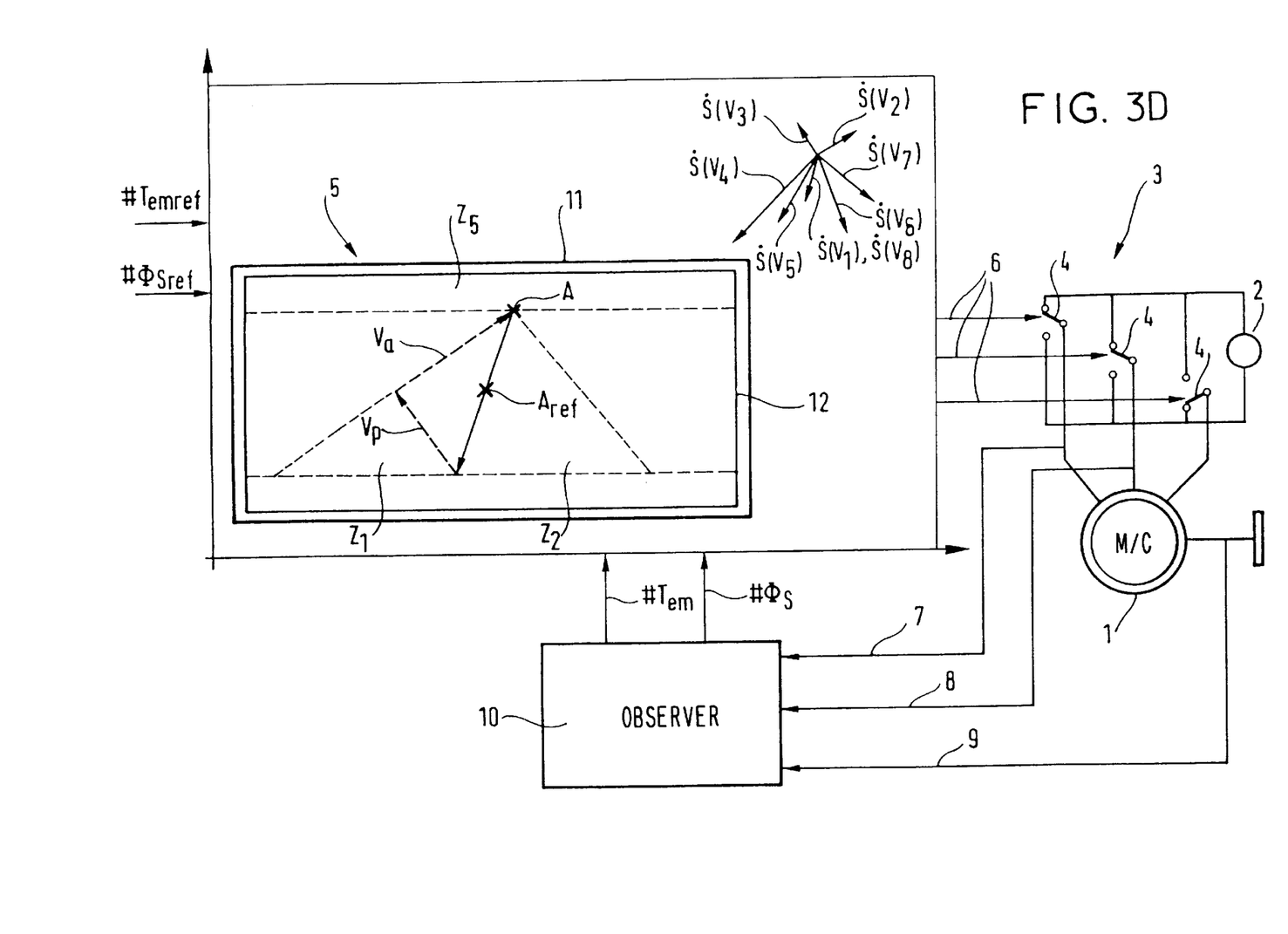
Figure 3E:
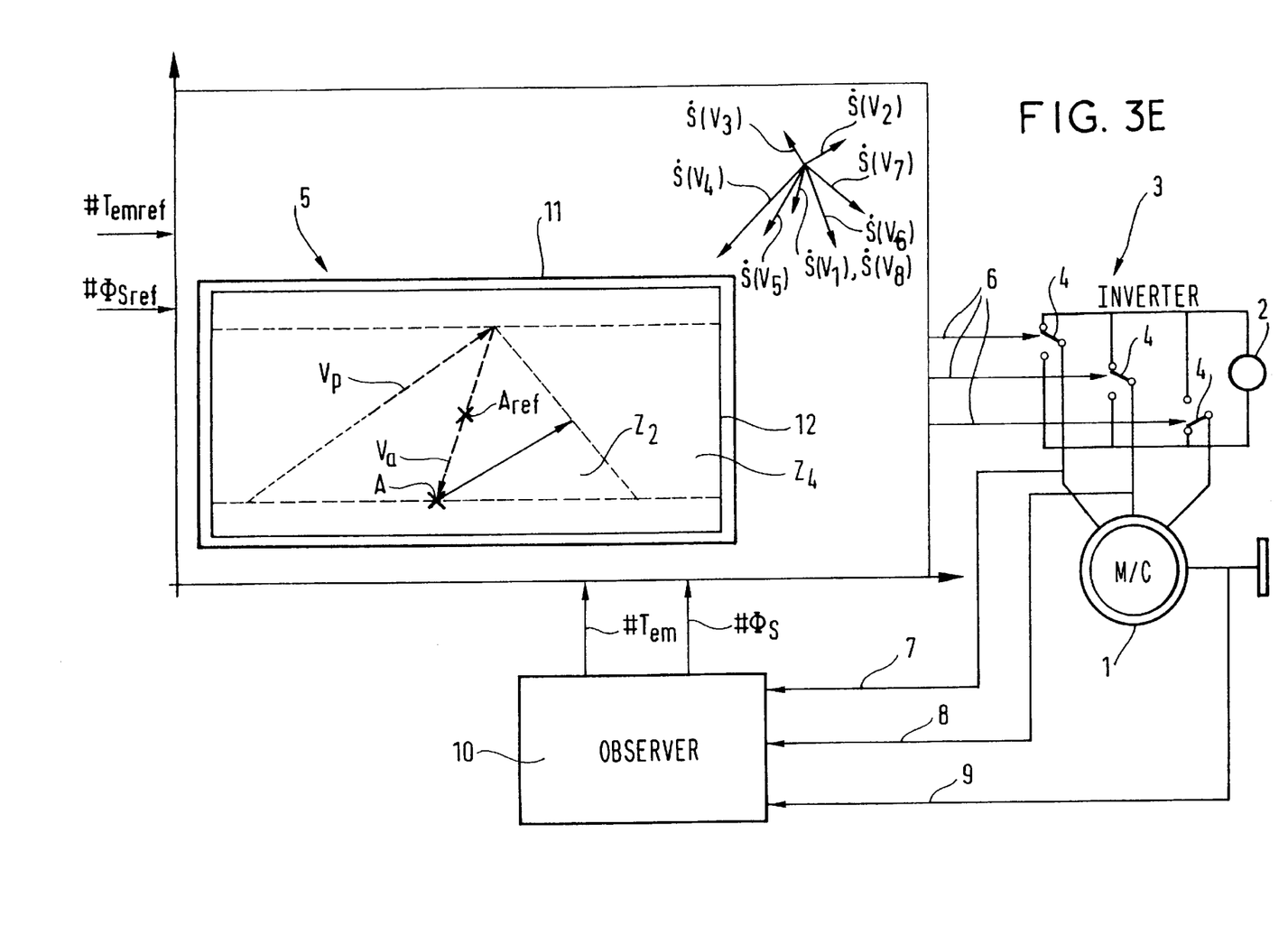

In one embodiment of the method shown in FIGS. 2 through 3E, to determine the optimal state, an output plane P with one axis (y) representative of the electromagnetic torque and the other axis (x) representative of the stator flux is constructed in the computer 13, a point $A_{ref}$ representing the commanded torque and stator flux in said plane and a point A representing the instantaneous configuration of the machine are defined, and a plane element 5 $\pm \Delta$ x, $\pm \Delta$ y is defined around the point $A_{ref}$ inside which the conditions are the steady state conditions and outside which the conditions are the transient conditions. Accordingly, the plane P is divided into two parts, each representing the respective conditions.

Under transient conditions, to reduce the response time it is necessary to converge towards the commanded values as quickly as possible. To this end, in the plane P, the method chooses from all possible states $V_i$ ($i \in \{1, \ldots, m^n\}$) of the stator phase voltage vector $V_s$ the one which offers the greatest speed of variation of the point A in a direction close to the ideal direction of convergence (A-$A_{ref}$).

To this end, in an initialization step, a state model of the rotating machine is introduced into the computer 13, in which the output vector S is a vector of the output plane P and the command vector C is the phase voltage vector $V_s$; and under transient conditions, on each sampling, the computer 13 calculates the vector (A-$A_{ref}$), the computer 13 calculates the directional derivative S of the output vector S for each of the available states $V_i$ of the phase voltage vector $V_s$, the computer 13 calculates the scalar product of each of the directional derivatives S($V_i$) of the output vector S by the vector (A-$A_{ref}$), the computer chooses as the command vector C the state $V_i$ of the phase voltage vector $V_s$ associated with the largest calculated scalar product.

FIG. 2 shows how the method works under transient conditions. The dashed line 15 represents the ideal path for A to converge to $A_{ref}$ as quickly as possible. In each sampling period, the vector (A-$A_{ref}$) and the optimal state are recalculated. The possible result is, for example, a path as shown by the curve 14.

The response dynamics to a negative torque differential are better than in the prior art.

For high values of n and/or m (many possible states), this has another advantage that if one of the SPmLL is accidentally stuck in a position that is not optimal for a given configuration the method will continue to choose from the remaining possible states the best possible state to converge to the commanded values. The dynamic performance of the control scheme is affected by this, but the risks of divergence or of torque peaks are eliminated.

Moreover (see FIGS. 3 through 3E), during the initialization step a cyclic path 15 is constructed in the computer 13 along which the point A circulates about the point $A_{ref}$ in the plane element 5, an average switching frequency for the inverter 3 is fed into the computer, the computer divides the plane 5 into commutation zones $Z_i$ matched to the cyclic path 15, the computer constructs a commutation table in which for each zone $Z_i$ it establishes the correspondence between the future optimal state $V_f$ of the stator phase voltage vector $V_s$ in accordance with current and past states $V_a$ and $V_p$ of the stator phase voltage vector $V_s$ to track the cyclic path 15 in said zone $Z_i$; and, under steady state conditions, and on each sampling operation the computer 13 calculates the sizes of the commutation zones $Z_i$ as a function of the instantaneous configuration of the machine so as to conform to the chosen average switching frequency the computer chooses as the command vector C the future optimal state $V_f$ of the stator phase voltage $V_s$ from the commutation table according to the zone $Z_i$ in which the point A is found and the current and past states $V_a$ and $V_p$ of the stator phase voltage vector $V_s$. The past state $V_p$ of the stator phase voltage vector $V_s$ is to be understood as being the previous commutation state.

FIGS. 3 through 3E and the commutation table below represent one example of implementation of the method under steady state conditions.

Steady state condition commutation table

| ZONE $Z_i$ | $V_p$ | $V_a$ | $V_f$ |
|---|---|---|---|
| $Z_1$ | $V_2$ | $V_3$ | $V_1$ |
|  | $\forall V_i$ | $V_2$ | $V_2$ |
|  | $\forall V_i \neq V_2$ | $V_3$ | $V_3$ |
|  | $\forall V_i$ | $V_i = \{V_1,V_5,V_7\}$ | $V_1$ |
|  | $\forall V_i$ | $V_i = \{V_4,V_6,V_8\}$ | $V_8$ |
| $Z_2$ | $V_3$ | $V_2$ | $V_8$ |
|  | $\forall V_i \neq V_3$ | $V_2$ | $V_2$ |
|  | $\forall V_i$ | $V_3$ | $V_3$ |
|  | $\forall V_i$ | $V_i = \{V_1,V_5,V_7\}$ | $V_1$ |
|  | $\forall V_i$ | $V_i = \{V_4,V_6,V_8\}$ | $V_8$ |
| $Z_3$ | $V_2$ | $V_3$ | $V_1$ |
|  | $\forall V_i$ | $V_2$ | $V_2$ |
|  | $\forall V_i \neq V_2$ | $V_3$ | $V_2$ |
|  | $\forall V_i$ | $V_i = \{V_1,V_5,V_7\}$ | $V_8$ |
|  | $\forall V_i$ | $V_i = \{V_4,V_6,V_8\}$ | $V_1$ |
| $Z_4$ | $V_3$ | $V_2$ | $V_8$ |
|  | $\forall V_i \neq V_3$ | $V_2$ | $V_3$ |
|  | $\forall V_i$ | $V_3$ | $V_3$ |
|  | $\forall V_i$ | $V_i = \{V_1,V_5,V_7\}$ | $V_1$ |
|  | $\forall V_i$ | $V_i = \{V_4,V_6,V_8\}$ | $V_8$ |
| $Z_5$ | $\forall V_i$ | $V_i = \{V_1,V_3,V_5,V_7\}$ | $V_1$ |
|  | $\forall V_i$ | $V_i = \{V_2,V_4,V_6,V_8\}$ | $V_8$ |
| $Z_6$ | $\forall V_i$ | $V_i = \{V_1,V_3,V_5,V_7\}$ | $V_1$ |
|  | $\forall V_i$ | $V_i = \{V_2,V_4,V_6,V_8\}$ | $V_8$ |

FIG. 3 shows the cycle 15 chosen. FIGS. 3A through 3E and the above table show one example of circulation of the point A according to the cycle 15 chosen.

The positions and the dimensions of the zones $Z_i$ obviously have an influence on the average inverter switching frequency and vice versa. Accordingly, the average inverter switching frequency is taken into consideration on constructing the zones $Z_i$.

Average inverter switching frequency control is an advantage in that it significantly limits the risks of damage to the SPmLL and therefore extends their service life.

In FIG. 3A, point A is either in zone $Z_2$ or in zone $Z_4$, the current state is $V_3$, the past state is $V_2$. In the future, the point A can pass into zone $Z_5$, $Z_1$ or $Z_3$. The commutation table shows that provided that A remains in zone $Z_2$ or $Z_4$ the future state will remain the current state $V_3$; if the point A enters one of the zones $Z_5$, $Z_1$ or $Z_3$, the future state is $V_1$.

FIGS. 3B through 3E can be explained in the same way using the commutation table.

Although based on a commutation table system, the method is relatively reliable under steady state conditions. The point A may tend to diverge and to move out of the plane element. The system then swings towards the transient conditions in which the optimal state $V_i$ available is chosen in accordance with the method for transient conditions.

The plane element 5 advantageously includes a hysteresis band having an inner limit 12 and an outer limit 11 such that:

switchover from transient conditions to steady state conditions is effected when the point A has passed the inner limit 12 of the hysteresis band; and switchover from steady state conditions to transient conditions occurs when the point A has passed the outer limit 11 of the hysteresis band.

A state model of the rotating machine is, for example, a non-linear affine control model of the type:

$$\dot{E} = f(E) + g(E)Vs$$

$$S = h(E)$$

where E is the state vector and f, g, h are analytic functions of the state vector E;

the directional derivative $\dot{S}$ of the output vector S is dependent on the state model:

$$\dot{S}(Vs) = \frac{\partial h(E)}{\partial E} \dot{E} = \frac{\partial h(E)}{\partial E} f(E) + \frac{\partial h(E)}{\partial E} g(E)Vs$$

In one embodiment, the y axis represents the electromagnetic torque directly and the x axis represents the square of the stator flux. The points of the plane P advantageously have the coordinates;

$$(\lambda \phi_s^2/\phi_o^2, (\lambda-1)T_{em}/T_o)$$

where $\lambda$ is a weighting coefficient the value of which is set by the rotating machine user. This weighting coefficient is used to assign a greater or lesser weight to one of the outputs relative to the other.

The invention also consists in a servocontrol system using the method described hereinabove, The invention finally consists in a rotating machine including a servocontrol system of this kind.

The invention is naturally not limited to the embodiment described and shown, but is open to many variants that will be evident to the skilled person without departing from the scope of the invention. In particular, without departing from the scope of the invention the cycle as proposed could be replaced by any other cycle yielding its own commutation zones and its own commutation table. Also, without departing from the scope of the invention the three SP2LL can be replaced by n SPmLL.

There is claimed:

1. A computer implemented method of regulating a rotating machine with n phases fed with alternating current by a voltage inverter, said voltage inverter including n SPmLL switches defining $M^n$ states $V_i$ (i∈{1, . . . , $m^n$}) of a stator phase voltage vector $V_s$, wherein an electromagnetic torque $T_{em}$ and a stator flux $\phi_S$ of said machine are slaved to a reference electromagnetic torque $T_{emref}$ and a reference stator flux $\phi_{Sref}$ by a servocontrol system including a set of sensors, wherein the values sensed by said sensors are transmitted to an observer, the outputs of said observer being input to a computer as signals corresponding to the electromagnetic torgue $T_{em}$ and the stator flux $\phi_s$, said computer providing at its output command signals to command said SPmLL of said voltage inverter to regulate the rotating machine, said method comprising:

determining whether the machine is in a transient condition, wherein the transient condition occurs when at least one of said electromagnetic torque $T_{em}$ and said stator flux $\phi_s$ are respectively far from the reference electromagnetic torque $T_{emref}$ and the reference stator flux $\phi_{Sref}$, choosing from all possible states $V_i$ of said stator phase voltage vector $V_s$ the state which is optimal for causing said torque $T_{em}$ and said stator flux $\phi_s$ to converge towards said reference torque $T_{emref}$ and said reference stator flux $\phi_{Sref}$ when it is determined in said determining step that the machine is in the transient condition; and producing command signals for commanding said SPmLL in accordance with the chosen state of said phase voltage vector $V_s$.

2. The method of regulating a rotating machine as claimed in claim 1 further comprising:

determining whether the machine is in a steady state condition, wherein the steady state condition occurs when said torque $T_{em}$ and said stator flux $\phi_s$ are respectively in a range $\pm \Delta T_{em}$ about the reference torque $T_{emref}$ and in a range $\pm \Delta \phi_s$ about the reference stator flux $\phi_{Sref}$, choosing from all possible states $V_i$ of said stator phase voltage vector $V_s$ the state which is optimal for a predefined average switching frequency of said inverter, and minimizing the amplitudes of the oscillations of said torque $T_{em}$ and said stator flux $\phi_s$ about said reference torque $T_{emref}$ and said reference stator flux $\phi_{Sref}$, respectively; and producing command signals for commanding said SPmLL according to the chosen state of said phase voltage vector $V_s$.

3. The method claimed in claim 1 further comprising an initialization step, said initialization step comprising:

constructing a virtual output plane P, wherein one axis y of the output plane corresponds to electromagnetic torque and the other axis x corresponds to stator flux, and wherein said reference torque and said reference stator flux are represented by a point $A_{ref}$ in the plane P and the torque and stator flux signals output by the observer are represented by a point A, wherein a plane element ($\pm \Delta x$, $\pm \Delta y$) is defined around said point $A_{ref}$, and wherein a steady state condition corresponds to a state where said point A is inside said plane element and said transient condition corresponds to a state where said point A is outside said plane element, loading a state model of said rotating machine into said computer wherein an output vector S is a vector of the output plane P and a command vector C is said phase voltage vector $V_s$; and under transient conditions, on each sampling of said torque $T_{em}$ and said stator flux $\phi_s$, said choosing step for choosing the optimal state comprises:

calculating a vector (A-$A_{ref}$), calculating the directional derivative S of said output vector S for each of the possible states $V_i$ of said phase voltage vector $V_s$, calculating a scalar product for each of said directional derivatives $S(V_i)$ of the output vector S and said vector (A-$A_{ref}$), choosing as said command vector C the state $V_i$ of said phase voltage vector $V_s$ associated with the largest of the calculated scalar products.

4. The method claimed in claim 3 wherein, said initialization step further comprises:

constructing a cyclic path along which said point A circulates about said point $A_{ref}$ in said plane element, dividing said plane element into commutation zones $Z_i$ matched to said cyclic path, inputting an average switching frequency for said inverter into said computer, and constructing a commutation table in which for each zone $Z_i$ there is established a correspondence between a future optimal state $V_f$ of said stator phase voltage vector $V_s$ as a function of a current state $V_a$ and a past state $V_p$ of said stator phase voltage vector $V_s$ to track said cyclic path in said zone $Z_i$ ; where under steady state conditions, and on each sampling of the torque $T_{em}$ and stator flux $\phi_s$, said step for choosing the optimal state comprises:

calculating the sizes of said commutation zones $Z_i$ as a function of the instantaneous configuration for torque and stator flux of said machine, in such a manner as to conform to the average switching frequency;

choosing as said command vector C the future optimal state $V_f$ of said stator phase voltage vector $V_s$, on the basis of said commutation table, according to the zone $Z_i$ in which said point A is located and the current state $V_a$ and the past state $V_p$ of said stator phase voltage vector $V_s$.

5. The method claimed in claim 3 wherein model of the rotating machine is a non-linear affine control model of the type:

$$E = f(E) + g(E)V_s$$

$$S = h(E)$$

where E is the state vector, and f, g, h are analytic functions of said state vector E; and wherein the directional derivative S of said output vector S is dependent on the state model:

$$\dot{S}(Vs) = \frac{\partial h(E)}{\partial E} \dot{E} = \frac{\partial h(E)}{\partial E} f(E) + \frac{\partial h(E)}{\partial E} g(E) Vs$$

6. The method claimed in claim 3 wherein said plane element includes a hysteresis band having an inner limit and an outer limit such that:

a changeover from said transient condition to said steady state condition occurs if said point A has crossed said inner limit of said hysteresis band; and a changeover from said steady state condition to said transient condition occurs if said point A has crossed said outer limit of said hysteresis band and wherein a control strategy for choosing a state for $V_s$ changes when there is a changeover from said steady state condition to said transient condition and vice versa.

7. A servocontrol system for a rotating machine with n phases fed with alternating current by a voltage inverter, said voltage inverter comprising n SPmLL switches defining $m^n$ states $V_i$ (i∈{1, ..., $m^n$}) of a stator phase voltage vector $V_s$, wherein an electromagnetic torque $T_{em}$ and a stator flux $\phi_s$ of said machine are slaved to a reference electromagnetic torque $T_{emref}$ and a reference stator flux $\phi_{sref}$ by said servocontrol system which further includes a set of sensors wherein the sensed values are transmitted to an observer as signals corresponding to the torque $T_{em}$ and stator flux $\phi_s$, the output of said observer being input to a computer, said computer producing at its output command signals for commanding said SPmLL of said voltage inverter, said servocontrol system using the method claimed in claim 1.

8. A rotating machine having the servocontrol system of claim 7.

9. The method of regulating a rotating machine as claimed in claim 1 further comprising:

determining whether the machine is in a steady state condition, wherein the steady state condition occurs when said torque $T_{em}$ and said stator flux $\phi_s$ are respectively in a range $\pm\Delta T_{em}$ about the reference torque $T_{emref}$ and in a range $\pm\Delta\phi_s$ about the reference stator flux $\phi_{Sref}$, choosing from all possible states $V_i$ of said stator phase voltage vector $V_s$ the state which is optimal for a predefined average switching frequency of said inverter, and conforming the torque $T_{em}$ to a frequency template for said torque $T_{em}$; and producing command signals for commanding said SPmLL according to the chosen state of said phase voltage vector $V_s$.

10. A servocontrol system for a rotating machine with n phases fed with alternating current by a voltage inverter, said voltage inverter comprising n SPmLL switches defining $m^n$ states $V_i$ (i∈{1, ..., $m^n$}) of a stator phase voltage vector $V_s$, wherein an electromagnetic torque $T_{em}$ and a stator flux $\phi_s$ of said machine are slaved to a reference electromagnetic torque $T_{emref}$ and a reference stator flux $\phi_{Sref}$ by said servocontrol system which further includes a set of sensors wherein the sensed values are transmitted to an observer as signals corresponding to the torque $T_{EM}$ and stator flux $\phi_s$, the output of said observer being input to a computer, said computer producing at its output command signals for commanding said SPmLL of said voltage inverter, said system using the method claimed in claim 9.

11. A rotating machine having the servocontrol system of claim 10.

* * * * *